A. D. Smith.
Faucet.
Nº 96,168.   Patented Oct. 26, 1869.
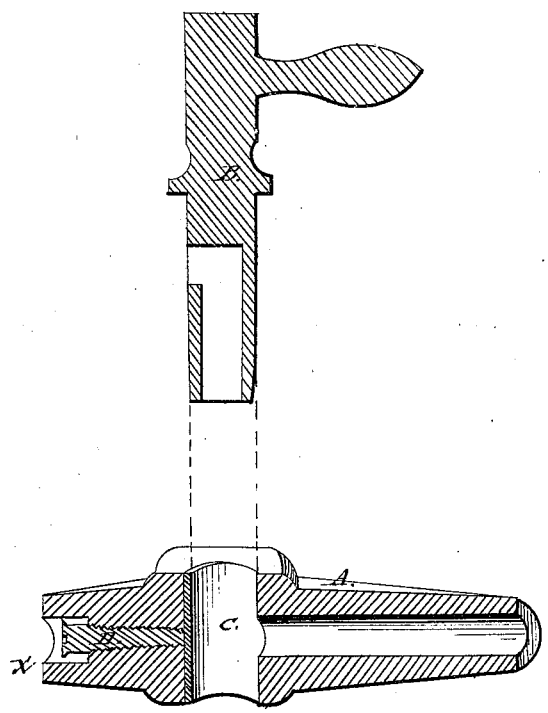
WITNESSES:
W. H. Cunningham
G. F. Packham
INVENTOR:
A. D. Smith

United States Patent Office.

A. D. SMITH, OF GRAFTON, OHIO.

Letters Patent No. 96,158, dated October 26, 1869.

---

IMPROVEMENT IN FAUCETS.

---

The Schedule referred to in these Letters Patent and making part of the same.

---

*To all whom it may concern:*

Be it known that I, A. D. SMITH, of Grafton, in the county of Lorain, and State of Ohio, have invented an Improvement in Faucets; and I do hereby declare the following to be a full and exact description thereof, reference being had to the accompanying drawing, and to the letters of reference marked thereon, in which—

Figures 1 and 2 are sectional views.

The nature of my improvement in faucets relates more particularly to the common class of wood faucets, in which a round, hollow plug-gate is made to turn, and form a part of the discharge-channel within the body of the faucet, and to open and close the same.

This class of faucets is the most desirable, for health and cheapness, if they were not so liable to become imperfect and useless with a little wear, which I remedy by the use of a screw-follower and block, which are made to follow up the wear, and hold the gate as tight or loose as desired, thus avoiding useless wear.

The following description will enable those skilled in the art to make and use the same.

The body of the faucet A and gate B may be made the same as those now in use, to which my improvement may be applied, by boring a hole (a little larger than the head of a common wood-screw) centrally in the outer end X of the body A, about half an inch deep.

I then insert and run a common wood-screw, D, through into the aperture C, where it comes in contact with the block E, which may be made from metal or wood, of any desired thickness, and not quite as wide as the diameter of the gate B, and nearly long enough to pass through the diameter of the faucet-body A, and fit into the side of the aperture C, next to the outer end X of the faucet, and outside of the diameter of the gate B, when in use, and should be concaved nearly enough to fit the side of the gate B, when set against it by the screw D, or its equivalent.

This faucet is superior to others, in being adjustable to the different degrees of pressure and wear necessary to insure tightness, lasting much longer from such adjustment, remaining perfect, when it would otherwise be useless.

What I claim as my improvement, and desire to secure by Letters Patent, is—

The combination of the block E with the gate B and body of the faucet A, for the purpose set forth.

Also, the combination of the screw D with the body of the faucet A, when so arranged, in relation to their adjoining parts, that, by turning in the screw D, the gate B is pressed against the opposite side of the aperture C from the screw D, for the purpose set forth.

A. D. SMITH.

Witnesses:
W. H. CUNNINGHAM,
G. F. PECKHAM.